United States Patent [19]

Braverman

[11] 4,216,242

[45] Aug. 5, 1980

[54] MICROCRYSTALLINE CELLULOSE IN FREEZABLE-GEL-CONFECTION COMPOSITIONS

[76] Inventor: Amiel Braverman, 5664 Darlington Rd., Pittsburgh, Pa. 15217

[21] Appl. No.: 4,153

[22] Filed: Jan. 17, 1979

Related U.S. Application Data

[63] Continuation-in-part of Ser. No. 828,929, Aug. 29, 1977, Pat. No. 4,140,807.

[51] Int. Cl.$^2$ .............................................. A23G 9/00
[52] U.S. Cl. .................................... 426/573; 426/567; 426/249; 426/660; 426/578
[58] Field of Search ............... 426/565, 566, 567, 573, 426/575, 660, 583, 584, 330.2, 249

[56] References Cited

U.S. PATENT DOCUMENTS

| | | | |
|---|---|---|---|
| 2,097,225 | 10/1937 | Green | 426/575 |
| 3,493,394 | 2/1970 | Eldridge | 426/577 |
| 3,499,768 | 3/1970 | Moirano | 426/575 |
| 3,784,715 | 1/1974 | Arden | 426/330.2 |
| 3,978,243 | 8/1976 | Pedersen | 426/575 |
| 3,996,390 | 12/1976 | Igow | 426/573 |

*Primary Examiner*—Jeanette M. Hunter
*Attorney, Agent, or Firm*—Berman, Aisenberg & Platt

[57] ABSTRACT

Freeze-it-yourself pops are prepared by sealing an edible, room-temperature-storable, storage-stable, aqueous, opaque, flavored confection in a plastic film pak. The confection composition is in the form of an aqueous gel having a pH within the range of from about 3.0 to about 5.0; it has a pudding consistency when maintained at room temperature, but has a chewy consistency when frozen. Activated or peptized microcrystalline cellulose in combination with a) carboxymethyl cellulose (CMC) and/or b) alginate (salt of alginic acid) and/or c) xanthan gum and/or d) modified starch provides the composition with homogeneity and stability even when formulated on a commercial scale.

23 Claims, No Drawings

MICROCRYSTALLINE CELLULOSE IN FREEZABLE-GEL-CONFECTION COMPOSITIONS

RELATED APPLICATION

This application is a continuation-in-part of application Ser. No. 828,929 (now U.S. Pat. No. 4,140,807) filed on Aug. 29th, 1977. The entire disclosure of the parent application is incorporated herein by reference.

THE TECHNICAL FIELD

Liquid confections having different colors and flavors (all substantially transparent) have been sold for subsequent freezing to an icy consistency ("ice pops"). These liquid confections are generally packaged in plastic packs, such as those made of polyethylene, cellophane and other similar films. Such confections comprise suitable flavoring, sugars, such as cane and corn sugars, acid, vegetable gum stabilizer and preservative, such as sodium benzoate and potassium sorbate or sorbic acid. The confection is conventionally sealed in the plastic film and is ordinarily sold in liquid form at room temperature. The thus-packaged confection is designed to be frozen prior to eating.

BACKGROUND ART

| A | HUNTER | USP | 1,043,839 | November 12, 1912 |
|---|---|---|---|---|
| B | NORTH | | 1,710,507 | April 23, 1929 |
| C | SCHOLL | | 1,781,249 | November 11, 1930 |
| D | WALLERSTEIN | | 1,854,353 | April 19, 1932 |
| E | SCHWEIGART | | 1,887,905 | November 15, 1932 |
| F | LINN | | 1,989,758 | February 5, 1935 |
| G | JOSEPH | | 1,993,932 | March 12, 1935 |
| H | LINN | | 2,014,623 | September 17, 1935 |
| I | GREEN | | 2,097,224 | October 26, 1937 |
| J | GREEN | | 2,097,225 | October 25, 1937 |
| K | FICK | | 2,106,089 | January 18, 1938 |
| L | HASKING | | 2,168,934 | August 8, 1939 |
| M | SIEHRS | | 2,267,624 | December 23, 1941 |
| N | WHITTINGHAM | | 2,493,732 | January 3, 1950 |
| O | NORTH | | 2,672,419 | March 16, 1954 |
| P | KOHLER | | 2,854,340 | September 30, 1958 |
| Q | BATTISTA | | 3,023,104 | February 27, 1962 |
| R | HERALD | | 3,067,037 | December 4, 1962 |
| S | SMITH | | 3,385,714 | May 28, 1968 |
| T | HOTELLING | | 3,486,905 | December 30, 1969 |
| U | DAGGY | | 3,649,302 | March 14, 1972 |
| V | BUNDUS | | 3,663,718 | May 16, 1972 |
| W | STEWART | | 3,666,497 | May 30, 1972 |
| X | McGINLEY | | 3,684,523 | August 15, 1972 |
| Y | ARDEN | | 3,784,715 | January 8, 1974 |
| Z | STRONG | | 3,911,144 | October 7, 1975 |
| AA | FINNEY | | 3,914,441 | October 21, 1975 |
| AB | McGINLEY | | 3,947,604 | March 30, 1976 |
| AC | FINNEY | | 3,993,793 | November 23, 1976 |
| AD | BRAVERMAN | | 4,140,807 | February 20, 1979 |

A points out the special precautions which must be taken to prepare a homogeneous food product containing cocoa.

B points out the additional difficulties encountered in preparing a mixture of milk with cocoa or chocolate to maintain the cocoa or chocolate in suspension. A syrup is prepared with thickeners, such as corn-starch, gelatin, vegetable gums, agar or a mixture of lime water and sugar.

C is directed to a chilled food beverage which includes milk and may also contain cocoa or chocolate-malt syrup. The product claims are limited to beverages with a specific gravity about one-half that of water and including minute bubbles of air and minute water ice crystals.

D confirms the problems encountered in trying to prepare a stable chocolate-containing product and one approach to solving such problems.

E provides a special process for breaking down protein substances and producing a cocoa preparation which may contain milk.

F is directed to making a stable milk-containing chocolate suspension with a vegetable or animal gum that swells in water and acts as a protective colloid or stabilizing gum.

G prevents or retards precipitation from cocoa-containing beverages (with or without milk) by incorporating pectin therein and maintaining the pH not substantially above 5.5

H concerns stable chocolate syrup containing, as a protective colloid, swelled starch and a small quantity of water-dispersible gum, agar-agar or pectin.

I uses a water-soluble alginate compound and Irish moss with a sweetening agent in a chocolate-milk drink. The disclosure reviews the shortcomings of other suspending agents in chocolate-milk-containing compositions.

J is directed to a dairy product containing milk, water-soluble alginate and water-soluble gum. J found that, when frozen dairy products are stabilized with a mixture of alginate and Irish moss, the resulting product has more body and does not melt as rapidly as when alginate only is used. Furthermore, such products, when compared with frozen dairy products stabilized with gelatin, are superior because they contain no animal products, melt without leaving a residue, have finer crystals of ice so that the ice cream remains smooth even when aged in dealer cabinets, and at the same time have a clean refreshing taste and flavor in the mouth. By varying the ratio between the amount of alginate and Irish moss used in ice cream, the speed of melting is controlled. The more Irish moss used, the slower the melting. Slow melting gives the impression of a richer or higher butterfat ice cream and one which is more chewy. A formulation for a chocolate-milk drink is provided in the last complete paragraph of the left column on page 2.

K is directed to a particular method of preparing a stable and homogeneous mixture of chocolate and milk for use as a beverage. Previously-encountered difficulties in this regard are acknowledged.

L concerns "soft serve" ice milk which is prepared by incorporating glycerin in its formulation.

M is directed to a non-settling chocolate-flavor drink comprising an aqueous liquid medium, chocolate particles and a mucilaginous extract of quince seeds.

N prepares a stabilized chocolate syrup and beverage from cocoa, edible fat and pectin, the final composition having a pH between 5.5 and 6.9.

O prepares a frozen concentrated mix with a chocolate flavoring ingredient. When frozen, the product does not harden but is flexible, as distinguished from a stiff-frozen condition. The product contains milk and a stabilizer, e.g. carageenin, sodium alginate, locust bean gum and gum karaya, for the cocoa or chocolate which does not give excessive viscosity at high concentrations of the mix in unfrozen condition.

P uses alginic acid amides as stabilizers in the preparation of ice cream, sherbet and ices.

Q relates to reduced-calorie food compositions comprising microcrystalline cellulose as an essential ingredient. The microcrystalline cellulose is described in some detail at columns 2 to 4.

R relates to foamable food products, particularly reduced-calorie toppings, incorporating microcrystalline cellulose (cellulose crystallite aggregates) as a non-nutritive quality-improving agent. Use of foamable agents, such as sodium alginate, starches, starch derivatives and sodium carboxymethylcellulose, is referred to in last seven lines of column 6.

S concerns a packaged liquid-milk-shake mix for refrigerated storage and containing a viscosity-control agent comprising a combination of a colloid selected from the group consisting of colloidal seaweed extracts and vegetable gums, and a cellulose gum; preferably a combination of carrageenin and sodium carboxymethylcellulose.

T uses a specific stabilizer to preclude precipitation from chocolate-flavored beverages. Column 2 provides comparative test data which confirm the stabilizing problem of cocoa-containing compositions.

U relates to a light-bodied, ambient-temperature storable, ready-to-spread frosting having an essentially-foamed cellular structure and requiring from about 0.5 to about 1.8 percent by weight of a colloidal cold-water swellable polysaccharide, preferably microcrystalline cellulose (exemplified by Avicel RC-501).

V is directed to the preparation of a non-stratified cocoa-containing edible composition.

W concerns the preparation of sterile viscous dairy products, such as pie fillings, puddings, ice cream mix concentrates and milk-shake concentrates, by incorporating therein an edible stabilizer, such as vegetable gum, synthetic gum, seaweed extract, starch or pectin, which promotes thickening and causes protein coagulation.

X provides a heat-sterilized, stable aqueous artificial dairy drink which comprises, e.g., cocoa, milk solids, $\beta$-1,4 glucan (microcrystalline cellulose) and carboxymethyl cellulose.

Y concerns cocoa-containing chocolate-flavored liquid confection compositions in which xanthan gum serves to suspend and stabilize the cocoa therein.

Z confirms that xanthan gum improves freeze-thaw stability, but lacks stabilizing properties of stabilizers, such as carboxymethyl cellulose and guar gum. The presence of the latter gums (in addition to xanthan gum) provides a number of benefits relating to viscosity and syneresis.

AA contemplates using microcrystalline cellulose, particularly with carboxymethyl cellulose, as stabilizer in the preparation of ice cream having a pH of from 3 to 5.2.

AB concerns a combination of microcrystalline cellulose with sodium carboxymethylcellulose in an edible jelly having improved spreadability and heat resistance.

AC is directed to the use of a combination of microcrystalline cellulose and carboxymethyl cellulose as a stabilizer system which is particularly useful for ice cream.

AD concerns a product similar to that of Applicant with a different stabilizer system.

STATEMENT OF THE INVENTION

Preparation of opaque freezable confections which have a liquid to pudding-like consistency at room temperature (20° C.) and which freeze to a chewy and virtually non-icy product presents a number of problems. In addition to normal concerns regarding precipitation, e.g. stratification and/or solid/liquid separation, and freeze-thaw stability, e.g. phase separation or syneresis, consideration must be accorded to extended shelf life and preservation against microbial spoilage. Moreover, production of a salable product on a commercial scale is essential for economic feasibility.

In order to prepare such a confection in a flexible-plastic-film or other suitable container, the container must be filled while the confection is hot (79° to 85° C. or 175° to 185° F.) to assure long shelf life and to avoid microbial spoilage. This is particularly important for freezable confections containing milk and/or cocoa solids and of relatively high pH, e.g. within the range of from 4.0 to 4.6. Mere incorporation of chemical preservatives in such confection compositions in tolerable (on the basis of acceptable taste considerations) amounts is generally inadequate for such purposes.

In order to destroy microorganisms present in the confection composition, from plant equipment and/or on packaging material, the temperature of the filled container must be maintained for at least several minutes after filling. The confection composition must then be cooled (at a rate of from 3° to 5° C. per minute) to about 38° C. (100° F.) to avoid physical changes.

Keeping freezer "pops" hot for several minutes after filling and then cooling them down prior to placement in boxes and cases requires substantial production space, an elaborate conveyor system and refrigeration equipment for a mass-scale operation. This complex and expensive mass-scale operation has now been materially streamlined by devising stabilizer systems for the confection compositions which obviate the need for the noted elaborate conveyor system and for refrigeration. With these stabilizer systems the confection compositions can be filled into containers while hot, packaged and boxed while still hot and allowed to cool down gradually (at an average rate of about 1° to 1.5° C. per hour) to ambient temperature in a warehouse without any adverse effect on physical characteristics.

DETAILED DESCRIPTION

A liquid to pudding-like (highly-dense) opaque confection, which freezes to a chewy and virtually non-icy product, is prepared with a wide range of flavors. In the non-frozen state solid particles, such as those of cocoa, fruit and pigment, are substantially-homogeneously suspended and maintained, thus providing, e.g., an edible pudding, pie filling and/or dessert topping (for those compositions having a pudding-like consistency) which does not require refrigeration. This confection has the following characteristics:

(1) Liquid to highly dense in consistency and opaque in appearance;
(2) Solid particles, such as those of cocoa, fruit (e.g. in the form of fruit paste, puree or pulp), titanium dioxide and artificial color, are suspended in a substantially-homogeneous product;
(3) When frozen, the product is chewy and virtually non-icy;
(4) It is prepared with a wide range of fruity flavors, including "acid fruits", such as cherry, lemon and orange, "low-acid fruits", such as mango, melon and coconut, and substantially non-acid fruits, such as banana;
(5) It is optionally prepared with virtually any other flavor, including chocolate, cinnamon, vanilla and caramel;

(6) It is virtually independent of pH within accepted practice, i.e., pH 3.0 is suitable for lemon; pH 3.2, for orange and cherry; pH 3.5, for grape; pH 3.8 for pineapple; pH 4.2, for melon; pH 4.3 for mango; pH 4.6, for coconut; pH 4.8, for butterscotch; pH 4.9, for caramel; and pH 5.0, for chocolate; pH 5.0 can be employed for "non-acid" products, but conformity to Federal Regulations (part 113) [cf. 21 CFR 507] requires special processing for all low-acid foods having a pH above pH 4.6.

(7) At room temperature the compositions of higher density assume a pudding-like consistency which makes them suitable for use as dessert pudding and pie filling All the noted characteristics are achieved through use of (1) specific stabilizers, wherein activated microcrystalline cellulose is in combination with at least one of carboxymethylcellulose (CMC), an alginate, xanthan gum and modified starch, and (2) opacity-, milkiness- or turbidity-producing agents, such as chocolate or cocoa, a milk product, non-dairy whitener, and natural or artificial color, e.g. titanium dioxide. The invention includes compositions which contain and those which are free from milk-derived solids. Chocolate compositions of both types, as well as those which are free from chocolate or cocoa solids, are readily prepared and are also within the scope of the invention.

Any of the noted stabilizers is useful in compositions containing any one or combination of opacifying agents.

An alginate is a salt of Alginic acid (extracted from seaweed). Alginic acid is a polymer of mannuronic acid and guluronic acid; the proportion between the two acids depends on the type of seaweed. Alkali-metal (e.g. sodium and potassium), alkaline-earth-metal (e.g. magnesium), ammonium and lower alkylamine salts are soluble in water and form appropriate viscous solutions. Sodium alginate is particularly suitable for use in foods and is especially useful in this invention. Potassium alginate and ammonium-calcium alginate are occasionally used in food as well. Although propyleneglycol alginate is used in food, it is not a preferred stabilizer for this invention.

When an alginate is used in a composition containing milk solids, the amount of alginate employed is somewhat restricted, since calcium from the milk tends to form a non-reversible gel with alginates.

Xanthan gum is produced by pure-culture fermentation of the microorganism, *Xanthomonas campestis*, which yields a high-molecular-weight polysaccharide from glucose. Xanthan gum is a mixed potassium, sodium and calcium salt of the polysaccharide. Xanthan gum ("Keltrol" of Kelco Co.) is especially useful for this invention.

Sodium carboxymethylcellulose (CMC) is an anionic water-soluble polymer derived from cellulose. Chemically, it is a cellulose ether, produced by reacting alkali cellulose with sodium monochloroacetate. The viscosity varies with differing degrees of polymerization. Although the viscosity of employed CMC is not critical, the proportion of CMC used is dependent on its viscosity. When CMC is used in combination with microcrystalline cellulose (MCC), the amount of the former is in excess of carboxymethylcellulose with which the MCC may be coated.

"Modified starch" is a term of art and is used throughout the specification and claims according to its art-recognized meaning. It is used in the same sense as "Food starch-modified" in the title of 21 CFR section 172.892. The metes and bounds of this expression are readily understood by those skilled in the art, and all such modified starches are suitable for use in the subject invention.

Milk or dairy products include skim milk, non-fat milk powder (NFDM), evaporated milk, condensed milk, whole milk powder, whey, cream, casein and derivatives. Among non-dairy products known as coffee whiteners, emulsified vegetable fat is the principal ingredient.

Edible acid is incorporated in the composition according to taste preferences for the particular flavor employed. Acidity (pH 4.6 and below) also restricts the growth of pathogenic microorganisms.

Specified means to suspend and stabilize solid particles are combined in an opaque, flavored confection composition to provide a substantially homogeneous stable edible product which (even when of a higher density) is stirrable (but will hold its shape when maintained in an undisturbed condition) at room temperature and can be frozen to a chewy condition. When maintained at room temperature, those compositions of higher density are in gel form; all compositions contain preservative, sweetener, flavor-imparting ingredient means, sufficient water to provide a desired density and acid means to adjust the pH. The confection composition is ordinarily sealed in the plastic film pak in which it is sold. (It is optionally placed, e.g., in a sealed plastic cup or other suitable container for subsequent use, for example, as pie filling or dessert topping.) By placing the plastic film pak or sealed plastic cup and enclosed flavored-confection composition in a home freezer, a freeze-it-yourself "pop" is produced.

Liquid confections have been prepared with many different fruit flavors, packaged in plastic film packages and sold at room temperature for subsequent freezing and for consumption in the form of a Popsicle without a stick (a "pop"). These confections were of different colors, but were all substantially transparent and, when frozen, assumed an icy consistency. The acidity of these confections was usually within a pH range of from 2.7 to 3.5, which was in line with the characteristic flavor being simulated, namely: that of higher-acid fruits, such as lemon, cherry, grape and orange.

In distinction from such confections, an object of this invention is to provide confection compositions having a liquid to pudding-like consistency and an opaque appearance. The flavor is that of a higher-acid fruit, but is not so limited; it is optionally that of a "low-acid" fruit, such as that of mango, guava, banana or coconut, or the flavor of a non-fruity, non-acid confection, such as one having a chocolate, a butterscotch or a caramel flavor. Acid is incorporated in the subject compositions, inter alia, to restrict pathogenic microorganism growth. A further object of the present invention is to provide a confection with a liquid to pudding-like texture and which, when frozen, is opaque in appearance and chewy (and substantially non-icy) in consistency.

An additional object of this invention is to provide a confection composition having a liquid to pudding-like consistency and the flavor of virtually any fruit, including "high-acid" fruit, such as lemon, cherry and orange, the confection composition having a pH which is limited only by taste and Government regulations (preferably at most pH 4.6).

The subject compositions (in non-frozen form) are made homogeneous, e.g., by imparting to them a viscosity which prevents or impedes any particles, such as those of fruit pulp, milk solids, artificial water-dispersible color (e.g. insoluble titanium dioxide) or chocolate, from separating or settling out. Cocoa and/or chocolate liquor normally gives opaqueness to chocolate-flavored confections, and artificial color, coffee whiteners or nonfat milk-derived solids (NFMS) normally give opaqueness to other confections within the scope of this invention.

Three major factors for insuring high quality, stable, mass-produced, liquid to semi-solid, freezable confections are:

A. Adequate preservation by hot filling.
B. Virtual elimination of physical deterioration, i.e., syneresis. [While a marginal amount of of syneresis is tolerable in a non-freezable pudding-type confection, virtual elimination of syneresis is imperative when the confection is to be frozen. Otherwise, the liquid which seeps out (due to syneresis) has a whitish color when it freezes; this is an impediment to salability and a deterrent to palatability.]
C. Preventing settling of cocoa or other solid particles, especially while the product is still hot and fluid.

The subject stabilizer system materially contributes to or is solely responsible for achieving each of these factors under commercial manufacturing conditions.

The stabilizer system is based on activated microcrystalline cellulose (e.g. FMC's Avicel RC-591), at a level of 0.5 to 5 percent in combination with one or any combination of the following:

A. Carboxymethyl cellulose (CMC)
B. Salt of alginic acid (Alginate)
C. Xanthan gum
D. Starch, modified The preferred combination comprises microcrystalline cellulose, CMC and starch.

Typical formulations (in percent by weight) are as follow:

|  | CHOCOLATE FLAVOR | | BUTTERSCOTCH VANILLA-FLAVORS | |
|---|---|---|---|---|
| Water | 69.36 | 70.36 | 63.20 | 63.20 |
| Potassium Sorbate | 0.1 | 0.1 | 0.1 | 0.1 |
| Microcrystalline Cellulose (activated) | 1.5 | 1.5 | 1.3 | 0.3 |
| Modified Tapioca Starch | 2.5 | 2.5 | 2.0 | 3.0 |
| CMC (e.g. Hercules 7HCF) | 0.1 | 0.1 | 0.15 | 0.15 |
| Cocoa | 2 | 2 | — | — |
| Coffee Whitener (e.g. Borden's Cremora) | — | — | 2 | 2 |
| Non-Fat Milk Solids | 1 | — | — | — |
| Sugar | 23 | 23 | 30 | 30 |
| Salt | 0.25 | 0.25 | 1 | 1 |
| Vanillin | 0.07 | 0.07 | 0.05 | 0.05 |
| Flavor | 0.02 | 0.02 | 0.1 | 0.1 |
| Malic Acid | 0.1 | 0.1 | 0.1 | 0.1 |
|  | 100% | 100% | 100% | 100% |

The microcrystalline cellulose (MCC) is mixed with the water before any other ingredient is put in. (The MCC, e.g. Avicel RC-591, is preliminarily "peptized" or activated by using strong agitation and creating a high shear.)

After that is accomplished, all the other ingredients are mixed in, and the mixture is heated to 79° to 82° C. or 175° to 180° F. for 10 minutes before charging into containers; 79° C. or 175° F. is the minimum filling temperature. This combination of "stabilizers" results in a product which is sufficiently fluid to be pumped and filled hot. It thickens to light gel when allowed to stand even at a temperature of from 79° to 82° C. or 175° to 180° F. The gel structure at this elevated temperature inhibits any particles in the composition from settling or separating.

When finally frozen, e.g., by a consumer, the frozen confection is neither gummy nor too thick to the taste. In fact it is stabilized in a manner similar to that of regular ice cream or like confection.

The use of any of the noted stabilizers singly or in any combination without MCC does not result in a satisfactory product. Only when microcrystalline cellulose is used in combination with one or more of the other gums (stabilizers) do the unexpected results occur, namely:

A. product is sufficiently fluid for facile pumping.
B. Product tends to gel lightly even when hot, eliminating any settling problems.
C. Light gel structure is maintained even with a prolonged period (1 hour or more) of heating while processing and a prolonged holding period (of heat while slowly cooling).
D. Physical breakdown of the product due to heat and prolonged storage is eliminated, thus resulting in a long shelf-life.

The ranges in weight percents of the stabilizers in the confection compositions are:

| MCC | 0.5 | to | 5% |
|---|---|---|---|
| CMC | 0.05 | to | 1% |
| Xanthan Gum | 0.05 | to | 1% |
| Starch (e.g. Tapioca or waxy Maize), Modified | 0.5 | to | 4% |
| Alginate (e.g. Sodium Alginate) | 0.1 | to | 1% |

In weight percentages compositions according to this invention contain from 0.08 to 0.2 percent of preservative, from 0.55 to 7.0 percent of stabilizer, from 20 to 38 percent of sweetener, sufficient food acid to obtain a desired (based on test) pH, natural and/or artificial flavor to taste and/or from 1 to 5 percent of chocolate liquor or cocoa, from 1 to 3 percent of NFMS and/or from 0.01 to 0.05 percent of artificial color. A chocolate-flavored composition is optionally prepared with chocolate flavor, an opacifier and artificial color, i.e. without chocolate or cocoa. The compositions are aqueous compositions containing sufficient water to provide a total-solid range between 20° and 40° C. Brix. Natural or artificial colors are incorporated in the compositions as desired, and salt is optional. The stabilizer serves to suspend solid particles, to eliminate syneresis even under conditions of mass production, to thicken the composition to a point of gellation, to impart storage stability and shelf life to the composition, to permit ambient cooling after hot filling and to provide the composition with a chewy or fudge-like consistency when it is frozen. The compositions have from 0.01 to 0.05 percent by weight of artificial color or from 1 to 4 percent by weight of some other ingredient to render it opaque; such ingredient is, e.g., chocolate liquor or cocoa when either of these is present, NFMS, an artificial water-dispersible color or pigment, an artificial (nondairy) creamer or a milk or other dairy product in other compositions. NFMS is an optional compoment in those compositions which contain chocolate liquor and/or cocoa.

The stabilizer is a key ingredient in these unique compositions. It must have at least two components, one of which is necessarily MCC, e.g. Avicel RC-591, which is activated or "peptized". Microcrystalline cellulose is cellulose crystallite aggregates with a level-off D.P. Level-off DP is the average level-off degree of polymerization measured in accordance with the paper by O. A. Battista entitled: "Hydrolysis and Crystallisation of Cellulose", Vol. 42, pages 502 to 507, *Industrial and Engineering Chemistry*, 1950. An example of microcrystalline cellulose is the water-dispersible cellulose crystallite aggregates described for use in food compositions in British Patent No. 961,398. (Also of U.S. Pat. Nos. 2,978,446, 3,157,518 and 3,539,365). A combination of microcrystalline cellulose and sodium carboxymethyl cellulose gives particularly good results, and the microcrystalline cellulose is preferably a material in which the particles are themselves coated with 10 percent (by weight of the material) of sodium carboxymethyl cellulose. The sodium carboxymethyl cellulose used for coating is preferably one of medium viscosity, that is one which, in 1 percent aqueous dispersion, has a viscosity of from 300 to 1000 centipoises at 20° C.

Microcrystalline cellulose has been listed in the *Fourth Supplement to the Food Chemicals Codex*, First Edition, by the National Academy of Sciences—National Research Council as: Cellulose, Microcrystalline (cellulose gel).

The other component comprises one or any combination of CMC (in addition to that with which the MCC may be coated), xanthan gum, starch and alginate. Table I presents illustrative stabilizer compositions in parts by weight.

TABLE I
STABILIZER COMPOSITIONS

|     | MCC* | CMC  | Xanthan Gum | Tapioca Starch | Sodium Alginate |
|-----|------|------|-------------|----------------|-----------------|
| (a) | 5.0  | 1.0  | —           | —              | —               |
| (b) | 4.5  | 0.8  | 0.8         | —              | —               |
| (c) | 4.0  | 0.6  | —           | 0.5            | —               |
| (d) | 3.5  | 0.4  | —           | —              | 0.8             |
| (e) | 3.0  | 0.2  | 0.1         | 0.7            | —               |
| (f) | 2.5  | 0.09 | 0.3         | —              | 0.2             |
| (g) | 2.0  | 0.07 | —           | 0.9            | 0.09            |
| (h) | 1.5  | 0.05 | 0.05        | 1.3            | 0.05            |
| (i) | 1.2  | —    | 1.5         | —              | —               |
| (j) | 1.0  | —    | 0.6         | 1.7            | —               |
| (k) | 0.9  | —    | 0.9         | —              | 0.6             |
| (l) | 0.8  | —    | 0.08        | 2.2            | 0.07            |
| (m) | 0.7  | —    | —           | 3.1            | —               |
| (n) | 0.6  | —    | —           | —              | 1.0             |
| (o) | 0.5  | —    | —           | 4.0            | 0.4             |

*2.0 percent of fully-peptized MCC is more than adequate, and there is no need to use a larger amount.

By using sufficient stabilizer (from 0.55 to 7.0 percent by weight, based on the total weight of the confection composition), partially predicated on the specifically-selected combination of components, solid particles present in the confection composition are suspended and stabilized by imparting to the admixture a thickness or texture (at room temperature or even at some higher temperature) which is advantageously on the verge or at the point of being semi-solid; it is referred to herein as a pudding-like texture.

The noted stabilizer combinations protect a composition (of this invention) from syneresis and from separation of insoluble ingredients even when the composition is kept hot for several hours in a vat prior to being filled [at filling temperature] into a suitable receptacle, container or ultimate package.

Chocolate-flavored confection compositions optionally contain NFMS and ordinarily contain chocolate liquor and/or cocoa. The term "cocoa" is intended to be interpreted in the same manner as in U.S. Pat. No. 3,784,715 (particularly column 2, lines 25 to 44), the pertinent text of which is incorporated herein by reference. Employed cocoa is either natural-process or Dutched-process cocoa and is optionally used either alone or in combination with chocolate liquor. From 1.5 to 2 percent by weight of natural medium-fat cocoa is preferred.

Although the sweetener can be synthetic sweetener, it is most advantageous to use a sweetener, such as cane sugar, corn syrup, corn sugar and/or high-fructose corn syrup, of natural origin. To obtain a desired degree of sweetness and consistency upon freezing, the preferred sweetener comprises equal amounts of 42 D E corn syrup and cane sugar. Both the chocolate-flavored and other confections according to this invention contain from 20 to 38 percent by weight of sweetener.

The contemplated preservative is a chemical preservative, such as sodium benzoate, potassium sorbate, sodium sorbate or sorbic acid. Potassium sorbate (0.12 percent by weight) is recommended both at least objectionable in taste and as most effective at the contemplated pH.

The acid employed to achieve the desired pH is any acid approved for use in food. Approximately 0.1 percent (or more) by weight of either, e.g., citric or malic acid is suitable for this purpose. The actual amount of acid used is that which is sufficient to obtain the desired taste and to comply with federal regulations; a pH of at most 4.6 is recommended.

The amount of water present in the aqueous confection compositions is dependent upon the type and concentration of sweetener. The soluble solids must result in an aqueous composition of from 20° to 40° Brix; a confection composition of 32° Brix is preferred.

What is meant by non-fat milk-derived solids (NFMS) is well known in the art. These naturally include non-fat dry-milk solids (NFDM), such as dried milk, and others, such as skim milk, whey and whey derivatives.

Fruit pulp in the form of, e.g., banana, mango or coconut puree or fruit concentrate, such as apple, citrus or pinneapple juice concentrate, is optionally included in these compositions. Such is not in any way critical to the present invention, and their selection as optional ingredients depends on particular flavor requirements and consumer demands. However, when any fruit particles (irrespective of size within the normal range) are present, they should be so suspended within the body of the confection as to make the non-frozen flavored confection composition appealing to the eye. The confection compositions are flavored to taste. Suitable flavorants include seasoning, such as salt, pure vanilla or artificial flavor, such as vanillin, ethyl vanillin and imitation fruit or chocolate flavors. Such seasoning and/or flavors are optionally incorporated in compositions either singly or in any suitable combination. The compositions are prepared in a blending tank equipped with a suitable agitator.

Starting with a measured amount of warm water at about 140° F. (60° C.), the preservative, the cocoa (when used), the starch (when used) and the milk solids (when used) are added first for best dispersability. The gum stabilizer, CMC, xanthan or alginate is added next and the resulting mixture is well agitated.

In a separate vessel, a water slurry of MCC, e.g. Avicel RC-591, is prepared and a high shear is applied to the slurry, either by using a high-speed mixer, a centrifugal pump or a homogenizer. The thus-peptized MCC is pumped into the main vat. All other ingredients, such as sugar, salt, flavoring, coloring and fruit pulp, are then added.

The final step in preparing the compositions is adjusting the pH. For this purpose a suitable acid is added until the composition has the desired taste and satisfies prevailing regulations. The acid employed must be one which is approved for use in food compositions.

When the batch is completed, it is heated in a steam kettle or in a continuous heater to the filling temperature of 175° to 180° F. (79.4° to 82.2° C.). The admixture is then filled, e.g. at 175° F. (79° C.) or higher according to conventional and well-established procedures into plastic packages suitable for filling and sealing at elevated temperatures. Filling at such a temperature insures that spoilage organisms do not develop. Thus-packaged confections are storable at room temperature for many months and are suitable for freezing just prior to eating.

In view of the nature and consistency of the subject compositions, they can be sold in non-refrigerated sealed containers. Even after the container is opened, the compositions keep without refrigeration and without deterioration for at least several days. The compositions are useful as desserts (pudding) or dessert topping (directly from the containers in which they are sold or as pie filling. When used as pie filling, the pie need not be refrigerated. A composition of this invention is readily placed in a prebaked pie shell, levelled off and served as is or with a suitable topping. If desired, such dessert can be refrigerated prior to serving.

Exemplary embodiments of the present invention are illustrated in Table 2 (pages 20 and 21). These embodiments are presented in the form of ingredients which are combined into compositions according to the previously-described precedure and similarly filled into and sealed in plastic packages in the art-established manner. The examples are presented solely for the purpose of illustration and do not limit the nature or scope of the invention in any way.

Microcrystalline cellulose (MCC), e.g Avicel RC-591 or RC-56, is completely (100 percent) "peptized" (activated or dispersed) by blending a 3 percent (w/v) aqueous slurry in, e.g., a Warning-type blender for 1 or 2 minutes. Alternatively, MCC is completely peptized by homogenizing a 3 to 4 percent (w/v) aqueous mixture in a dairy, e.g. a Menton-Gaulin, type homogenizer. On a smaller production scale, e.g. for a 50-gallon 3 percent (w/v) slurry of Avicel RC-591 in a suitable vat, a high-speed "Lightnin"-type propeller mixer is appropriate. A less efficient, but otherwise convenient method which requires little capital calls for circulating a 3 to b 4 percent (w/v) aqueous slurry of, e.g., Avicel RC-591 through a high-speed (3600 rpm) centrifugal pump; however, this method normally results in only from 70 to 80 percent peptization, and 20 to 30 percent more MCC is thus required in formulations according to this invention.

Comparative results with different types of mixing equipment are reflected in Table III.

TABLE III

DISPERSION OF AVICEL RC-581 AND AVICEL RC-591 IN DISTILLED WATER AND CITY WATER

| | | Mixing Devices | | | |
|---|---|---|---|---|---|
| | | Propeller Mixer | Propeller Mixer | Centrifugal Pump | Waring Blender |
| Product | Water | low speed ½ hr. | high speed ½ hr. | recirculating ½ hr. | 2 min. 110 volts |
| RC-581 | distilled | 34.8%* | 74.7% | 74.2% | 100.0% |
| RC-591 | distilled | 100.0 | 100.0 | 100.0 | 100.0 |
| RC-581 | city-264 μmhos | 4.0 | 6.6 | 33.9 | 82.7 |
| RC-591 | city-264 μmhos | 12.6 | 22.2 | 100.0 | 100.0 |

*Completeness of dispersion (peptization) is expressed in %; 100% = complete peptization, 0% = no peptization.

There are a number of critical features in the present invention. The compositions are opaque; the opacity thereof is brought about by any of many dairy products, e.g. milk, cream and caseinates, by non-dairy creamers, e.g. Cremora Powder, by artificial color and/or by the component which imparts a chocolate or cocoa flavor to the confection. The flavor of the confection is that of a fruit, chocolate, cocoa, butterscotch, caramel or other non-fruity confection. The composition has a pudding-like texture and total soluble solids reflected by a range of from 20° to 40° Brix, corresponding to a density from approximately 1.083 to about 1.1787. When frozen, the composition has a chewy or fudge-like character. The pH of the composition can be as high as pH 5.0 or even higher, but is conveniently at most pH 4.6 in view of federal regulations. The lower end of the range is about pH 3.0.

TABLE 2

| | CONFECTION COMPOSITIONS | | | | | | | | | |
|---|---|---|---|---|---|---|---|---|---|---|
| | EXAMPLE | | | | | | | | | |
| Ingredients (% by weight) | 1 | 2 | 3 | 4 | 5 | 6 | 7 | 8 | 9 | 10 |
| | Chocolate | | | | Orange | Vanilla | Mango | | Butterscotch | |
| Water | 52.852 | 61.54 | 59.8 | 64.58 | 70.57 | 66.22 | 54.57 | 73.54 | 73.34 | 61.75 |
| Potassium Sorbate | 0.12 | 0.15 | 0.12 | 0.15 | 0.05 | 0.20 | 0.08 | — | 0.12 | 0.15 |
| Sodium Benzoate | 0.08 | — | — | — | 0.08 | — | 0.10 | 0.20 | — | — |
| Cream | — | — | — | — | 1.00 | 1.00 | — | — | — | — |
| NFMS | 2.00 | — | 2.00 | — | — | — | 1.60 | 1.00 | 2.00 | 3.00 |
| Coffee Whitener$^i$ | — | 2.00 | — | — | — | — | — | — | — | — |
| MCC$^a$ (Avicel RC 591)$^1$ | 5.0 | 4.0 | 0.7 | 2.0 | 1.5 | 1.2 | 0.9 | 3.0 | 0.6 | 0.5 |
| Xanthan Gum | — | — | — | — | 0.05 | 1.0 | 0.9 | 0.1 | — | — |
| Starch$^b$ | — | 0.5$^j$ | 3.1$^k$ | 0.9$^j$ | 1.3$^k$ | — | — | 0.7$^j$ | — | 4.0$^k$ |
| Sodium Alginate | — | — | — | 0.09 | 0.05 | — | 0.6 | — | 1.0 | 0.4 |
| Hi-Viscosity CMC$^c$ | 0.1 | 0.06 | — | 0.07 | 0.05 | — | — | 0.2 | — | — |
| Cocoa (10 to 11% Fat) | 1.50 | 2.00 | 2.00 | 2.00 | — | — | — | — | — | — |
| Chocolate Liquor | — | 0.50 | — | — | — | — | — | — | — | — |
| Corn Syrup Solids | — | — | — | — | — | 15.00 | 20.00 | — | — | — |

TABLE 2-continued

| Ingredients (% by weight) | CONFECTION COMPOSITIONS EXAMPLE | | | | | | | | | |
|---|---|---|---|---|---|---|---|---|---|---|
| | 1 | 2 | 3 | 4 | 5 | 6 | 7 | 8 | 9 | 10 |
| | Chocolate | | | | Orange | Vanilla | Mango | | Butterscotch | |
| Orange Oil | — | — | — | — | 0.02 | — | — | — | — | — |
| Mango Flavor[d] | — | — | — | — | — | — | 0.06 | 0.04 | — | — |
| Butterscotch Flavor[d] | — | — | — | — | — | — | — | — | 0.03 | 0.04 |
| Chocolate Flavor[d] | 0.02 | 0.04 | — | — | — | — | — | — | — | — |
| Vanillin | 0.02 | 0.01 | 0.02 | 0.01 | — | 0.20 | 0.05 | 0.05 | — | — |
| Ethyl Vanillin | 0.008 | — | — | — | — | — | — | — | — | — |
| Corn Syrup 42 DE[e] | 28.00 | 15.00 | 15.00 | 15.00 | 10.00 | — | — | 5.00 | 8.00 | 15.00 |
| Sucrose | 10.00 | 14.00 | 17.00 | 15.00 | 15.00 | 15.00 | 20.00 | 15.00 | 14.00 | 15.00 |
| Citric Acid | 0.10 | 0.10 | 0.10 | 0.10 | — | — | — | 0.10 | 0.10 | — |
| Malic Acid | — | — | — | — | 0.25 | 0.10 | 0.11 | — | — | 0.11 |
| Salt | 0.20 | 0.10 | 0.16 | 0.10 | 0.08 | 0.06 | 0.01 | 0.04 | 0.80 | 0.03 |
| FD&C Yellow #6[f] | — | — | — | — | — | — | 0.02 | 0.03 | — | — |
| Orange Concentrate[g] (58° Brix) | — | — | — | — | — | — | 1.00 | 1.00 | — | — |
| Caramel Color[h] | — | — | — | — | — | — | — | — | 0.01 | 0.02 |
| Titanium Dioxide | — | — | — | — | — | 0.02 | — | — | — | — |

[a]Peptized or Activated
[b]Modified (within 21 CFR 172.892)
[c]Hercules 7H3SCF
[d]Artificial, water disperable
[e]Dextrose Equivalent
[f]4.7 percent solution
[g]Frozen
[h]Acid proof
[i]Cremora (Borden)
[j]Tapioca Starch (Staley's Tender Fil 8)
[k]Waxy Maize Starch (Rezista Starch)
[l](cf. Table 1)

All compositions which satisfy all of these criteria are regarded to be within the scope of the invention. The preceding description is susceptible to various modifications, changes and adaptations, as is readily apparent to those skilled in the art.

What is claimed is:

1. An edible, room-temperature storable, virtually-syneresis-free, stable, opaque, flavored, solid-particle-containing confection composition having a liquid to pudding-like consistency at room temperature and comprising:
    (a) an effective amount of peptized-microcrystalline-cellulose-containing stabilizer suitable to suspend and stabilize the solid particles, to permit ambient cooling from a microbiocidal temperature without refrigeration and without physical deterioration, to minimize syneresis, to thicken the composition and to produce a chewy and substantially non-crystalline product when said composition is frozen;
    (b) from 0.08 to 0.2 percent by weight of preservative;
    (c) sufficient flavoring to impart flavor to the composition;
    (d) from 20 to 38 percent by weight of sweetener;
    (e) sufficient water to impart to the composition a density in the approximate range of from 20° to 40° Brix; and
    (f) sufficient acid to adjust the pH of the composition within the range of from about pH 3.0 to about 5.0.

2. A confection composition according to claim 1 wherein the stabilizer comprises a combination of ingredients.

3. A confection composition according to claim 2 wherein an essential ingredient of the stabilizer is carboxymethyl cellulose.

4. A confection composition according to claim 2 wherein an essential ingredient of the stabilizer is xanthan gum.

5. A confection composition according to claim 2 wherein an essential ingredient of the stabilizer is modified starch.

6. A confection composition according to claim 5 wherein the starch is tapioca starch.

7. A confection composition according to claim 5 wherein the starch is waxy maize.

8. A confection composition according to claim 2 wherein an essential ingredient of the stabilizer is an alginate.

9. A confection composition according to claim 8 wherein the alginate is an alkaline-earth or alkali-metal alginate.

10. A confection composition according to claim 2 which comprises from 0.5 to 5 percent by weight of peptized microcrystalline cellulose and from 0.05 to 1.0 percent by weight of carboxymethyl cellulose.

11. A confection composition according to claim 2 which comprises from 0.5 to 5 percent by weight of peptized microcrystalline cellulose and from 0.05 to 1.0 percent by weight of xanthan gum.

12. A confection composition according to claim 2 which comprises from 0.5 to 5 percent by weight of peptized microcrystalline cellulose and from 0.05 to 4 percent by weight of modified starch.

13. A confection composition according to claim 2 which comprises from 0.5 to 5 percent by weight of peptized microcrystalline cellulose and from 0.1 to 1.0 percent by weight of sodium alginate.

14. In the preparation of a heat-sterilized, edible, room-temperature storable, stable, freezable, aqueous, opaque, flavored, solid-particulate containing confection composition comprising stabilizer means to suspend and stabilize the solid particles, to thicken the composition and to produce a chewy product when the composition is frozen and wherein heat sterilization is followed by cooling the composition to about 38° C. or lower, the improvement wherein the stabilizer means are a combination of peptized microcrystalline cellulose with at least one member selected from the group consisting of carboxymethyl cellulose, xanthan gum, modified starch and alginate, whereby ambient cooling is effected without physical deterioration of said composition and without adversely affecting the appearance of the composition when it is subsequently frozen.

15. A process for avoiding physical deterioration of an edible, room-temperature storable, stable, freezable, aqueous, opaque, flavored, solid-particle containing confection composition comprising stabilizer means to suspend and stabilize the solid particles, to thicken the composition and to produce a chewy product when the composition is frozen during ambient cooling from a heat-sterilization temperature of from about 79° to 85° C. to a temperature of about 38° C. or lower by limiting the stabilizer means to one which comprises from 0.5 to 5 percent of peptized microcrystalline cellulose in combination with at least one member selected from the group consisting of (a) from 0.05 to 1.0 percent of carboxymethyl cellulose, (b) from 0.05 to 1.0 percent of xanthan gum, (c) from 0.5 to 4.0 percent of modified starch and (d) from 0.1 to 1.0 percent of alginate, all percentages being by weight and based on the total weight of said confection composition.

16. A freezable confection composition according to claim 1, having a pH in the range of from 4.0 to 4.6 and containing milk solids.

17. A freezable confection composition according to claim 1, having a pH in the range of from 4.0 to 4.6 and containing cocoa solids.

18. A storage-stable freezable composition according to claim 1 which is completely surrounded by and sealed in a plastic film pak.

19. A process for producing a product according to claim 18 at ambient temperature which consists essentially of charging a plastic film pak with the confection composition at a temperature within the range of from 79° to 85° C. and sealing the plastic film pak while said confection composition is at that temperature.

20. A confection composition according to claim 2 wherein the microcrystalline cellulose comprises particles coated with about 10 percent by weight of carboxymethyl cellulose.

21. A freezable confection composition according to claim 2 which is free from chocolate and cocoa.

22. A freezable chocolate confection composition according to claim 2 which is free from milk-derived solids.

23. A freezable confection composition according to claim 2 which is free from milk-derived solids.

* * * * *